US010990416B2

(12) United States Patent
Morgan et al.

(10) Patent No.: US 10,990,416 B2
(45) Date of Patent: Apr. 27, 2021

(54) LOCATION-BASED MOBILE APPLICATION PROCESSING

(71) Applicant: NCR Corporation, Atlanta, GA (US)

(72) Inventors: Kip Oliver Morgan, Atlanta, GA (US); David Taylor Baker, Cumming, GA (US); Miguel Cintron, Oviedo, FL (US); Sirang Taudray Woolheater, Alpharetta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/526,696

(22) Filed: Jul. 30, 2019

(65) Prior Publication Data

US 2021/0034378 A1    Feb. 4, 2021

(51) Int. Cl.
*G06Q 30/02* (2012.01)
*G06F 9/445* (2018.01)
(Continued)

(52) U.S. Cl.
CPC ....... *G06F 9/4451* (2013.01); *G06Q 30/0241* (2013.01); *G06F 8/63* (2013.01);
(Continued)

(58) Field of Classification Search
CPC ........... G06Q 30/0266; G06Q 30/0241; G06Q 30/0207; G06Q 30/0222; G06Q 30/0623; G06Q 30/02; G06Q 30/0259; G06Q 30/0201; G06F 11/14; G06F 8/63; G06F 9/4451; H04L 67/10; H04L 67/18; H04L 67/38
See application file for complete search history.

(56) References Cited

U.S. PATENT DOCUMENTS 8,825,753 B2 * 9/2014 Kaleem ............ H04N 21/26291
 709/203
10,051,415 B1 * 8/2018 Lalka ...................... H04W 4/02
(Continued)

OTHER PUBLICATIONS

Daniel Salber et al., The Context Toolkit: Aiding the Development of Context-Enabled Applications, May 15-20, 1999, [Retrieved on Nov. 22, 2016]. Retrieved from the internet: <URL: https://dl.acm.org/doi/pdf/10.1145/302979.303126> 8 Pages (434-441) (Year: 1999).*
(Continued)

*Primary Examiner* — Anibal Rivera
(74) *Attorney, Agent, or Firm* — Schwegman, Lundberg & Woessner

(57) ABSTRACT

A mobile device includes an originally downloaded mobile application. When a location of the mobile device is detected within a configured distance of a target enterprise store location, configuration data for the target enterprise's mobile application and services are obtained and automatically sent to the mobile device. The configuration data is applied to the original mobile application. When the user launches the original mobile application from the mobile device, the executing instance of the mobile application is transformed into the target enterprise's mobile application connected to the target enterprise's mobile application services server. The executing instance of the mobile application includes the branding, design, features, and workflow of the target enterprise's mobile application.

8 Claims, 4 Drawing Sheets

(51) Int. Cl.
   *H04L 29/08* (2006.01)
   *G06F 8/61* (2018.01)
   *G06F 11/14* (2006.01)
   *G06Q 30/06* (2012.01)

(52) U.S. Cl.
   CPC .......... *G06F 11/14* (2013.01); *G06Q 30/0266* (2013.01); *G06Q 30/0623* (2013.01); *H04L 67/10* (2013.01); *H04L 67/18* (2013.01)

(56) References Cited

U.S. PATENT DOCUMENTS

| | | | |
|---|---|---|---|
| 10,257,291 B1* | 4/2019 | Matiash | H04L 67/22 |
| 10,334,396 B2* | 6/2019 | Lyman | H04W 4/021 |
| 2012/0042036 A1* | 2/2012 | Lau | H04W 4/60 |
| | | | 709/217 |
| 2012/0058782 A1* | 3/2012 | Li | H04W 4/029 |
| | | | 455/456.2 |
| 2012/0179527 A1* | 7/2012 | Ball | G06Q 30/0207 |
| | | | 705/14.17 |
| 2013/0073336 A1* | 3/2013 | Heath | G06Q 30/02 |
| | | | 705/7.29 |
| 2013/0073366 A1* | 3/2013 | Heath | G06Q 30/0259 |
| | | | 705/14.25 |
| 2013/0073388 A1* | 3/2013 | Heath | G06Q 30/02 |
| | | | 705/14.53 |
| 2013/0193201 A1* | 8/2013 | Bradley | G06Q 30/0623 |
| | | | 235/375 |
| 2013/0205196 A1* | 8/2013 | Han | G06F 40/14 |
| | | | 715/234 |
| 2013/0339422 A1* | 12/2013 | Kaleem | H04N 21/41407 |
| | | | 709/203 |
| 2014/0006129 A1* | 1/2014 | Heath | G06Q 30/0222 |
| | | | 705/14.23 |
| 2014/0236709 A1* | 8/2014 | Aguayo | G06Q 30/0241 |
| | | | 705/14.44 |
| 2014/0324606 A1* | 10/2014 | Fortuna | G06Q 20/322 |
| | | | 705/15 |
| 2014/0368601 A1* | 12/2014 | deCharms | H04L 65/403 |
| | | | 348/14.02 |
| 2015/0011187 A1* | 1/2015 | Wetzold | H04W 12/0023 |
| | | | 455/411 |
| 2015/0025975 A1* | 1/2015 | Wallach | G06Q 30/0266 |
| | | | 705/14.63 |
| 2015/0039392 A1* | 2/2015 | Kobres | G06Q 20/3224 |
| | | | 705/7.32 |
| 2015/0095171 A1* | 4/2015 | Morgan | G06Q 10/105 |
| | | | 705/16 |
| 2015/0095767 A1* | 4/2015 | Ebner | G06F 16/9577 |
| | | | 715/238 |
| 2015/0178750 A1* | 6/2015 | Robinson | G06Q 30/0266 |
| | | | 705/7.34 |
| 2015/0281333 A1* | 10/2015 | Albert | H04L 67/38 |
| | | | 715/744 |
| 2015/0294431 A1* | 10/2015 | Fiorucci | G07B 15/02 |
| | | | 705/13 |
| 2015/0350266 A1* | 12/2015 | O'Brien | H04W 4/021 |
| | | | 709/204 |
| 2015/0358810 A1* | 12/2015 | Chao | H04W 4/50 |
| | | | 455/418 |
| 2016/0094598 A1* | 3/2016 | Gedikian | H04W 4/021 |
| | | | 455/456.3 |
| 2016/0094944 A1* | 3/2016 | Kong | H04W 4/022 |
| | | | 455/456.1 |
| 2016/0135006 A1* | 5/2016 | Fjeldsoe-Nielsen | H04W 4/023 |
| | | | 455/456.3 |
| 2017/0161716 A1* | 6/2017 | Hurley | H04W 4/023 |
| 2017/0195990 A1* | 7/2017 | Ben-Tzur | H04W 12/06 |
| 2018/0011863 A1* | 1/2018 | Xin | G06F 16/9537 |
| 2018/0285210 A1* | 10/2018 | Mitkar | G06F 11/3006 |
| 2018/0313959 A1* | 11/2018 | Dunlap | G06Q 30/0201 |
| 2018/0367483 A1* | 12/2018 | Rodriguez | H04L 51/046 |
| 2018/0367484 A1* | 12/2018 | Rodriguez | H04L 67/36 |
| 2019/0028835 A1* | 1/2019 | Lyman | H04L 67/18 |
| 2019/0073676 A1* | 3/2019 | Wang | G06Q 40/025 |
| 2019/0104382 A1* | 4/2019 | Lalka | H04L 51/20 |
| 2019/0173745 A1* | 6/2019 | Rjeili | G06Q 10/109 |
| 2020/0028753 A1* | 1/2020 | Powar | G06Q 20/32 |
| 2020/0092332 A1* | 3/2020 | Bhattathiri | H04L 63/107 |
| 2020/0184545 A1* | 6/2020 | Barkan | G06K 7/1417 |

OTHER PUBLICATIONS

Pierre A. Akiki et al., RBUIS: Simplifying Enterprise Application User Interfaces through Engineering Role-Based Adaptive Behavior, Jun. 24-27, 2013, [Retrieved on Nov. 22, 2016]. Retrieved from the internet: <URL: https://dl.acm.org/doi/pdf/10.1145/2494603.2480297> 10 Pages (3-12) (Year: 2013).*

* cited by examiner

LOCATION-BASED MOBILE APPLICATION PROCESSING

BACKGROUND

Mobile applications are prolific in the industry. Each consumer has many mobile applications on his/her phone. Many of these different applications perform the same or similar function, each are usually associated with a single business or entity. Each business supports its own unique interface, as a result consumer struggle with navigating the different interfaces when a mobile application is used and is unable to perform actions that the consumer desired to perform.

The numerous mobile applications also occupy a significant amount of storage space on the phone, which forces the consumer to remove applications from time to time in order to free up space for more important digital assets that the consumer does not want to delete. Consequently, the consumer may entirely forget about a business's application that the consumer once had, which is bad news for the business. Moreover, should the consumer subsequently redownload a previously deleted application, the previous saved customizations (including user identifier and password) are no longer available for use and must be re-entered by the consumer. By this point in time, the consumer may have forgotten the user identifier and password for the respective business. This is an inconvenience and most likely the consumer will re-delete the application before the consumer tries to figure out how to obtain the forgotten identifier and/or reset the forgotten password.

From the business's perspective, supporting mobile applications is a business necessity, but it is not usually within the core competency of the business. So, the business either hires technical staff to develop and support its mobile services or the business outsources its mobile services to a third-party provider. In either case, the business experiences substantial expenses and must continually update its mobile services for a variety of changing business conditions.

SUMMARY

In various embodiments, methods and systems are provided for location-based mobile application processing.

According to an embodiment, a method for location-based mobile application processing is presented. A current physical location of a mobile device is continuously reported to a server. Configuration data is received, the configuration data is associated with an enterprise application (app) for an enterprise detected to be within a configured distance of the current physical location by the server. An existing mobile app associated with an existing enterprise is transformed into an instance of the enterprise app, and the instance is connected to an enterprise server of the enterprise. Finally, the instance is processed on the mobile device to interact with enterprise mobile services associated with the enterprise.

DETAILED DESCRIPTION

Figure 1:
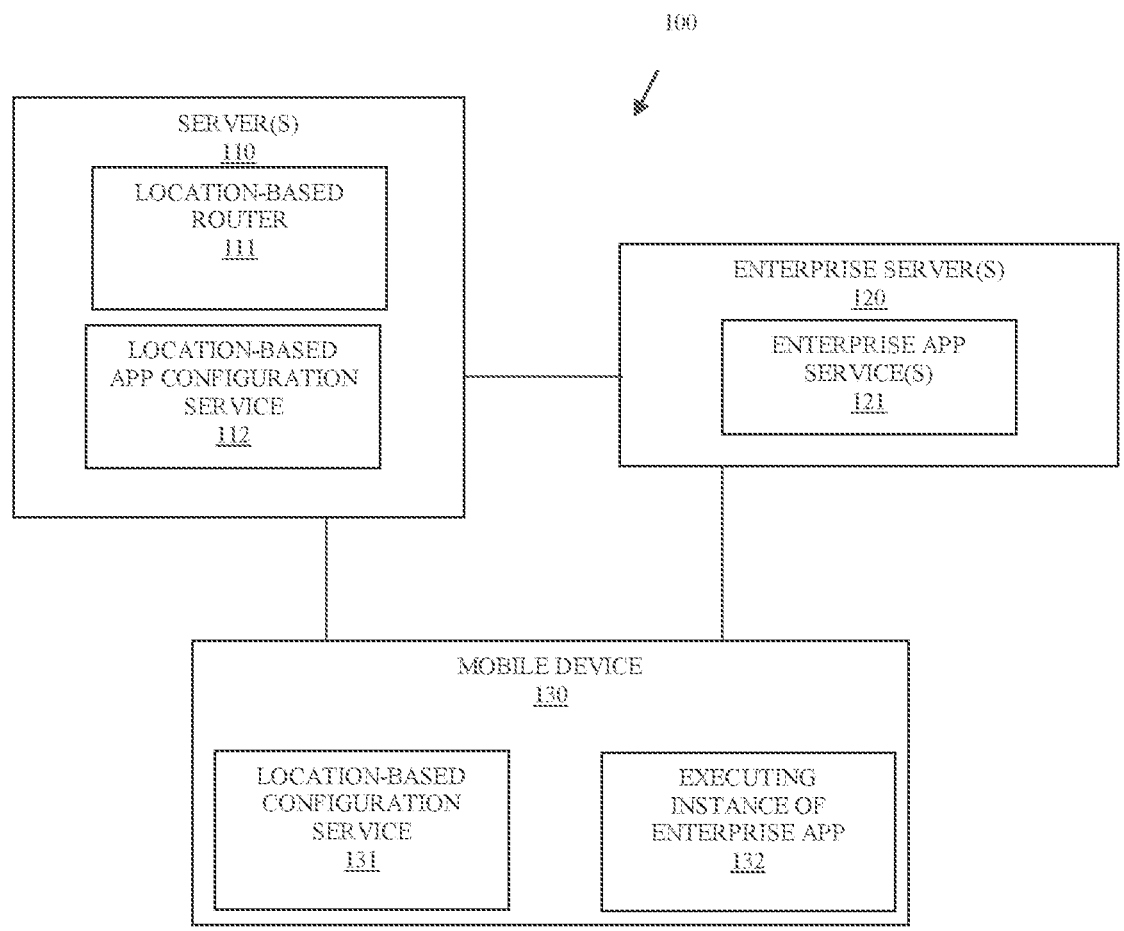
FIG. 1 is a diagram of system for location-based mobile application processing, according to an example embodiment.

FIG. 1 is a diagram of a system 100 for location-based mobile application processing, according to an example embodiment. It is to be noted that the architecture 100 is presented in greatly simplified form with just those elements necessary for comprehending the various embodiments presented herein shown. Other architectures with more or less elements and arranged differently may be used without departing from the teachings herein relevant to location-based mobile application processing.

As will be discussed more completely herein and below, the methods and systems permit a consumer's mobile device to have a single mobile application that is automatically configured to interface and present to the consumer as a specific enterprise's mobile application based on a location of the mobile device. When a consumer moves from one enterprise to another enterprise, the single mobile application is automatically configured to interface and represent the enterprise of the consumer's location. In this way, the consumer can have one mobile application for a plurality of enterprises.

The system 100 includes one or more servers 110, a plurality of enterprise servers 120, and a mobile device of a consumer 130. The servers 110 include processors and non-transitory computer-readable storage medium having executable instructions representing a location-based router 111 and a location-based app configuration service 112; the executable instructions when executed by causes the processor to perform the processing discussed herein and below with respect to the location-based router 111 and the location-based app (application) service 112. Each of the enterprise servers 120 includes a processor and non-transitory computer-readable storage medium having executable instructions representing an enterprise app service 121; the executable instructions when executed by causes the processor to perform the processing discussed herein and below with respect to the enterprise app service 114. The mobile device 130 includes a processor and non-transitory computer-readable storage medium having executable instructions representing a location-based configuration service 131 and an executing instance of a single enterprise app 132; the executable instructions when executed by causes the processor to perform the processing discussed herein and below with respect to the location-based configuration service 131 and the executing instance of the enterprise app 132.

Initially, a user of mobile device 130 downloads a specific-branded mobile app from an app store. In an embodiment, the specific branded mobile app is FastLane® distributed by NCR®, Inc. The specific branded app is configured to serve a specific enterprise and its mobile services but is also modifiable by the location-based configuration service 131 to be changed or rendered into one or more different enterprise apps associated with different enterprises as discussed herein and below.

The location-based router 111 receives location-based information reported by the location-based configuration service 131 of the mobile device 130. The location-based router 111 uses the longitude and latitude coordinates reported by the mobile device 130 and uses a table lookup to identify the enterprise that the mobile device 130 is within a configurable distance of. Identifiers for this enterprise location and enterprise are sent to the location-based app configuration service 112.

In an embodiment, the location-based router 111 is located on a different and separate server from the location-based app configuration service 112. In this embodiment, the location-based configuration service 131 reports location data of the mobile device 130 to the location-based router 111, the location-based router 111 then engages the location-based app configuration service 112 on the separate server to deliver the configuration data for the corresponding target enterprise app to the location-based configuration service 131. In an embodiment, the enterprise location identifier and the enterprise identifier are returned from the location-based router 111 back to the location-based configuration service 131 causing the location-based configuration service 131 to contact the location-based app configuration service 112 with the enterprise location identifier and the enterprise identifier (this processing can also be achieved through Uniform Resource Locator (URL) redirection in the response from the location-based router that causes the location-based configuration service to automatically contact the location-based app configuration service with the enterprise location identifier and the enterprise identifier).

The location-based app configuration service 112 uses the enterprise location identifier and enterprise identifier to locate enterprise app configuration data for an enterprise app associated with the corresponding enterprise. The location-based app configuration service 112 then sends the enterprise app configuration data to the location-based configuration service 131.

The location-based configuration service 131 configures the specific already-downloaded mobile app (template mobile app) stored on the mobile device 130 with the enterprise app configuration data and initiates the executing instance of the enterprise app 131 on the mobile device 130 by connecting the executing instance 132 with the corresponding enterprise's service 121.

When the consumer looks at his/her mobile device 130 and selects an icon for the template mobile application (originally downloaded mobile app that is being used as a template), the appearance of the template in the icon will reflect the initial enterprise associated with the template mobile application and its corresponding enterprise and branding (colors, logos, shapes, etc.).

However, when the consumer/user opens the template mobile application through selection of the icon and the template mobile application launches on the mobile device 130, it will launch as an executing instance of an enterprise 100 132 reflecting the applied configuration data for the enterprise that the consumer is in proximity to (based on the mobile device's reported current geographic location) and it will not launch as the enterprise app of the original enterprise associated with the template mobile app. The look and feel of the interface of the executing instance 132 will reflect the look and feel of the target enterprise's mobile application. Additionally, the features of the executing instance 132 will reflect the features available for the enterprise's mobile services. Still further, the executing instance 132 directly interfaces with the corresponding enterprise's app service 121.

In an embodiment, for each enterprise supported by the template mobile application, the location-based configuration service 131 retains either on the mobile device 130 or on server 120 local settings and customizations made by the consumer (specific to the consumer) for each enterprise. These customizations are applied after the template is populated with the specific enterprise's configuration data, such that if the consumer has automatically log on to that enterprise, this feature is retained for each separate enterprise. Other customizations supported and specific to the consumer are retained as well.

The mobile app configuration data includes branding information, localizations, processing workflows, and feature sets. The branding includes images that match images for the specific enterprise's mobile application, visual design of screens, colors having a list of color hues for foreground screens, background screens, button design and layout, and text fonts, text sizes, text colors, animations. Localizations include data indicating a proper written/spoken language (English, Spanish, Chinese, etc.) that is used by the enterprise. Workflows include a list of values indicating how the enterprise's mobile application transitions from screen to screen based on detected events activated by the feature sets. The feature sets include the operations and/or functions provided with the given enterprise's mobile application, such as payment options, settings, product catalogue searching, application guide, item details, languages available, options available with the given enterprise's mobile application.

The configuration data is also provided with a connection location to the specific enterprise app service 121. Once the configuration data is applied by the location-based configuration service 131, the corresponding enterprise app service 121 is connect to. The app service 121 then interacts with the executing instance of the app 132 as it would from a native enterprise mobile app.

In an embodiment, the configuration data is delivered from the location-based app configuration service 112 to the location-based configuration service 131 as an URL link having all the embedded transformations, processing instructions, and image rendering needed by the location-based configuration service to change the original downloaded template mobile app into the target enterprise mobile app.

Example transformations and the corresponding configuration data embedded within URLs for transforming an original template mobile app to a different executing instance of a different enterprise mobile app are supplied in Appendix A.

In an embodiment, the design, color scheme, and other branding for the appearance of a launch icon for the template mobile application (original enterprise app) on the mobile device is changed as soon as the location-based configuration service 131 is provided a target enterprise's mobile app configuration data (when the mobile device 130 is within a configured distance of a store of the target enterprise). So, the launch icon can be automatically changed.

In an embodiment, the launch icon remains fixed as the design and branding associated with the original downloaded template app and its corresponding app services 121, however, when configuration data for a target mobile app is received, the location-based configuration service 131 pushes an Operating System (OS) message that displays a notification on the mobile device to the user 130. The notification says open the enterprise app associated with template mobile app to access a target enterprise's mobile app since you are in a vicinity of the target enterprise's store.

In an embodiment, when the mobile device 130 is not detected as being within a configured distance of any known and supported enterprise store, the template or original mobile application serving the original enterprise operates as an executing instance of the enterprise app 131 associated with the original enterprise's services and branding.

In an embodiment, an option is added to the executing instance of the original or template mobile app 132 that permits the user to change the executing instance 132 dynamically from the original enterprise associated with the template mobile app to a user selected enterprise mobile app. In this scenario, the executing instance of the template mobile app 132 presents a listing of supported enterprise apps for selection by the user. When selected by the user, the location-based configuration service 131 requests configuration data for that selected enterprise app from the location-based app configuration service 112. Once the selected enterprise app configuration data is received back by the location-based configuration service 131. The executing instance of the original or template enterprise app 132 is closed or shut down. The location-based configuration service then performs the transformation on the template mobile app and automatically initiates a new executing instance of the enterprise app that reflects the branding, interface, and features of the selected enterprise app connected to the selected enterprise app service 121. This embodiment allows the location-based dynamic switching to also support user-selected dynamic switching.

In an embodiment, the configuration data can distinguish specific stores within a same enterprise that include their own customizations for an enterprise's mobile application. That is, the enterprise location identifier may be used to map to a specific unique enterprise app associated with an enterprise store for a given enterprise. So, multiple different configurations of an enterprise's mobile app can be accounted for and handled. Therefore, the techniques here support both branding and apps between different enterprises and intra-branding and apps within a single enterprise.

In an embodiment, the existing mobile app or original template app can be launched based on a Near Field Communication (NFC) tap with an NFC tag or device. In this embodiment, the user may force a specific existing instance of an enterprise app 132 to be rendered from the existing mobile app by touching an in-store NFC tag or device.

One now appreciates how a single template mobile app associated with an original enterprise app service 121 can be dynamically transformed and connected to a different enterprise app service and service as that different enterprise's mobile application based on a location of a user's mobile device 130. This permits a single mobile application to reside on a user's mobile device 130 while support two or more completely different enterprises' apps. This saves space, increases use by the users of enterprise services 121 (because the user does not have to keep track of different apps and always has access to a need app through a single original template app), and allows enterprises to deploy mobile apps in a seamless way reducing startup expense and ongoing support expense.

These and other embodiments are now discussed with reference to the FIGS. 2-4.

Figure 2:
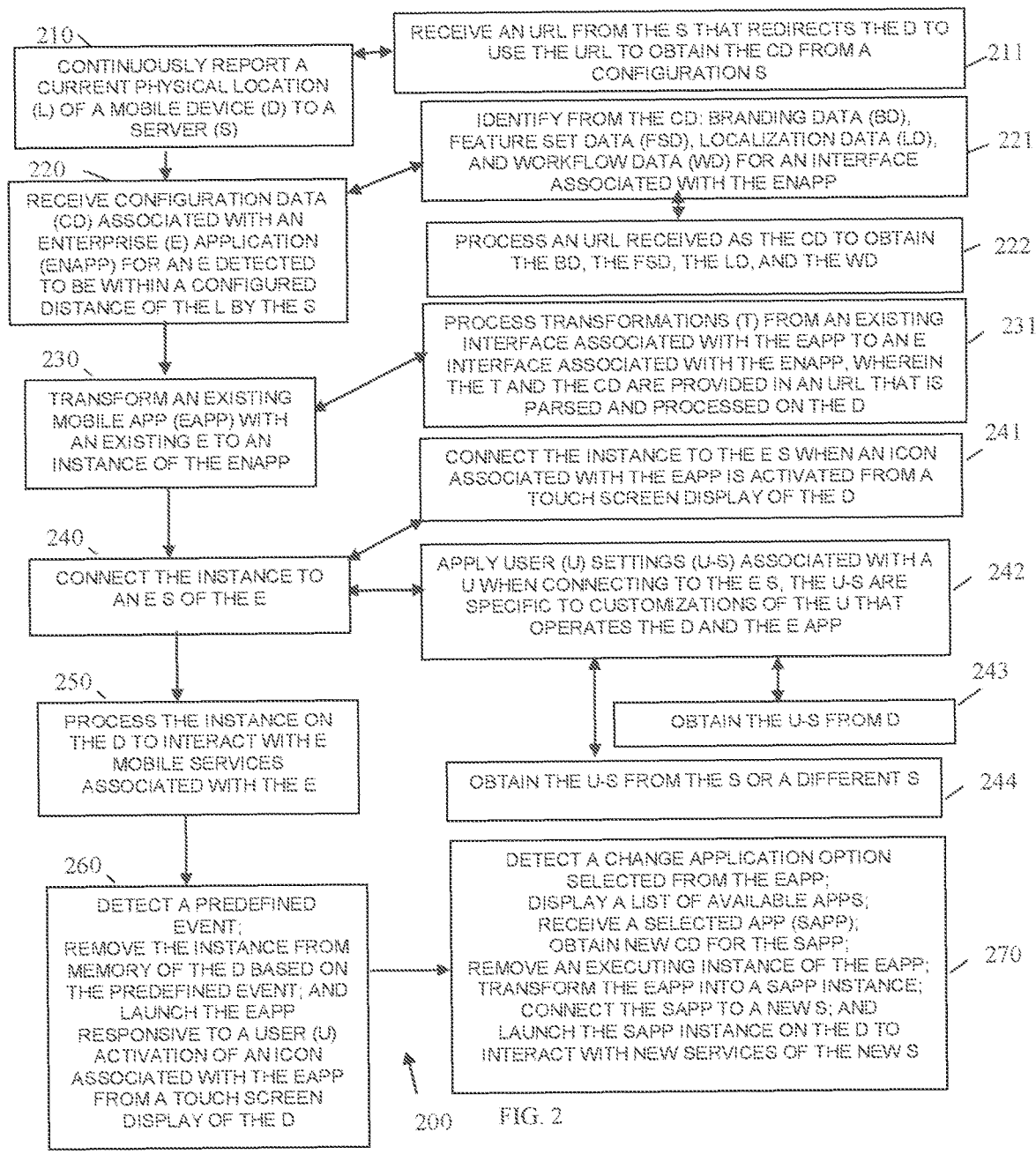
FIG. 2 is a diagram of a method for location-based mobile application processing, according to an example embodiment.

FIG. 2 is a diagram of a method 200 for location-based mobile application processing, according to an example embodiment. The method 200 is implemented as executable instructions as a collection of software modules referred to collectively as a "location-based mobile application." The executable instructions reside in a non-transitory computer-readable storage medium and are executed from the non-transitory computer-readable storage medium by one or more processors of a mobile device. The mobile device has access to one or more networks during execution of the location-based mobile application by the processor. The networks can be wired, wireless, or a combination of both wired and wireless.

In an embodiment, the mobile device that executes the location-based mobile application is a mobile device 130. In an embodiment, the mobile device 130 is a phone, a tablet, or a wearable processing device.

In an embodiment, the location-based mobile application is all of, or some combination of: the location-based configuration service 131 and the executing instance of the enterprise app 132.

At 210, the location-based mobile application continuously reports a current physical location of a mobile device to a server. This can be done utilizing location services of the mobile device and reporting the longitude and latitude coordinates to the server and done at predefined intervals of time when the device is detected as traveling. Other techniques can be used as well.

At 211, the location-based mobile application receives an URL from the server that redirects the mobile device to use the URL in order to obtain the configuration data from a configuration server. This option was discussed above with the FIG. 1 and system 100.

At 220, the location-based mobile application receives the configuration data associated with a specific enterprise mobile application from an enterprise that was detected to be within a configured distance of the current reported physical location by the server. This specific enterprise application can be based on a specific enterprise store of a given enterprise or associated with the enterprise as a whole; such that enterprises that have different mobile applications of variations of mobile applications based on a given store location can be customized as well with the teachings presented here.

In an embodiment, at 221, the location-based mobile application identifies from the configuration data: branding data, feature set data, localization data, and workflow data for an interface associated with the enterprise application. This was discussed above with the FIG. 1 and example types of these data are provided in the attached Appendix A.

In an embodiment of 221 and at 222, the location-based mobile application processes an URL received as the configuration data to obtain the branding data, the feature set data, the localization data, and the workflow data.

At 230, the location-based mobile application transforms an existing mobile application with an existing enterprise to an instance of the enterprise mobile application using the configuration data.

In an embodiment, at 231, the location-based mobile application processes transformations from an existing interface associated with the enterprise mobile application. The transformations and the configuration data provided in an URL that is parsed and processed on the mobile device. Again, an example of these transformation is provided in the attached Appendix A.

At 240, the location-based mobile application connects the instance to an enterprise server of the enterprise using the configuration data.

In an embodiment, at 241, the location-based mobile application connects the instance to the enterprise server when an icon associated with the existing mobile application is activated from a touch screen display of the mobile device.

In an embodiment, at 242, the location-based mobile application applies user settings associated with the user when connecting to the enterprise server. The user settings are specific to customizations of the user that operates the device and the enterprise application.

In an embodiment of 242 and at 243, the location-based mobile application obtains the user settings from the mobile device.

In an embodiment of 242 and at 244, the location-based mobile application obtains the user settings from the server or from a different server that maintains the user settings on behalf of the user.

At 250, the location-based mobile application processes the instance of the enterprise mobile application on the mobile device to interact with enterprise mobile services associated with the enterprise.

In an embodiment, at 260, the location-based mobile application detects a predefined event (such as new location outside a location associated with a store of the enterprise, a configured amount of no activity performed by the user with the instance of the enterprise mobile application, a reboot of the mobile device, user specifically kills the executing instance, etc.). Based on the detected event, the executing instance of the enterprise mobile application is removed from memory (if it has not already been removed based on the event itself as noted above). The location-based mobile application launches the existing mobile application (associated with an entirely different enterprise and its mobile services) responsive to a user activation of an icon associated with the existing mobile application from a touch screen display of the mobile device.

In an embodiment of 260 and at 270, the location-based mobile application detects a change application operation that is selected from the existing application. Responsive to this, the location-based mobile application displays a list of available mobile applications associated with different enterprise stores and/or different enterprises. The location-based mobile application receives a selection from the list to a selected mobile application. The location-based mobile application removes an executing instance of the existing mobile application from memory of the mobile device and obtains configuration data for the selected mobile application from the server. Next, the location-based mobile application transforms the existing mobile application into a selected mobile application instance using the newly received configuration data. Finally, the location-based mobile application automatically launches the selected mobile application instance on the mobile device for interaction with new mobile device services associated with the new enterprise server.

In an embodiment of 270, the location-based mobile application does not kill or remove the existing mobile application from memory or processing on the mobile device; rather, the location-based mobile application allows multiple configured and different instances of the existing mobile application and/or different enterprise applications to be simultaneously available and running on the mobile device.

Figure 3:
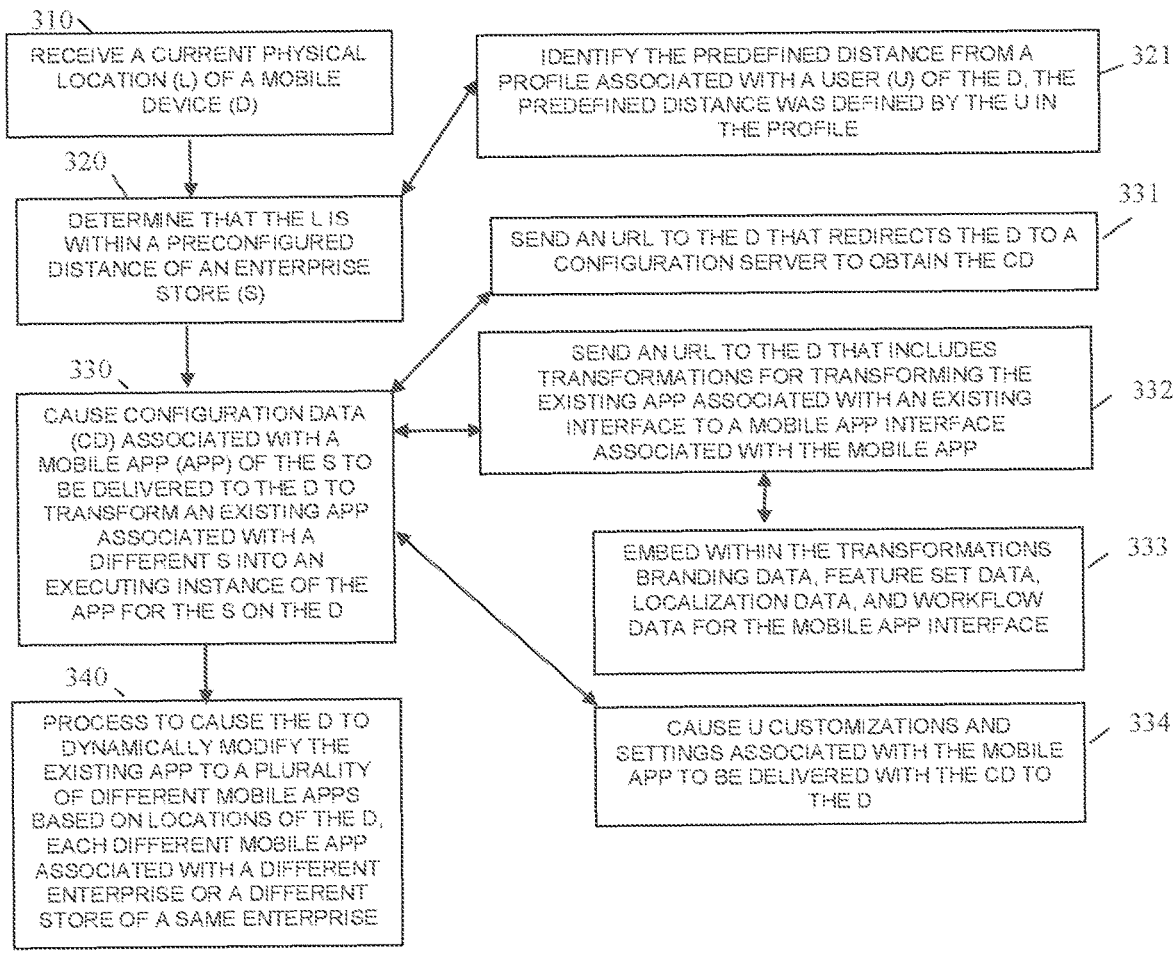
FIG. 3 is a diagram of another method for location-based mobile application processing, according to an example embodiment.

FIG. 3 is a diagram of a method 300 for location-based mobile application processing, according to an example embodiment. The method 300 is implemented as executable instructions as a collection of software modules referred to collectively as a "location-based mobile app manager." The executable instructions reside in a non-transitory computer-readable storage medium and are executed from the non-transitory computer-readable storage medium by one or more processors of one or more servers. The location-based mobile app manager has access to one or more networks during execution of the location-based mobile app manager by the processor. The networks can be wired, wireless, or a combination of both wired and wireless.

In an embodiment, the server(s) that executes the location-based mobile app manager is server(s) 110. In an embodiment, the server(s) 110 are part of a cloud-processing environment.

In an embodiment, the location-based mobile app manager is the location-based router 111 and the location-based app configuration service 112.

In an embodiment, the location-based mobile app manager interacts with a mobile device and the method 200 of the FIG. 2 to perform location-based mobile application transformations and branding on a single original or template mobile application.

At 310, the location-based mobile app manager receives a current physical location of a mobile device.

At 320, the location-based mobile app manager determines that the location reported by the mobile device is within a preconfigured distance of an enterprise store that supports mobile application services for a mobile application.

In an embodiment, at 321, the location-based mobile app manager identifies the predefined configured distance from a profile associated with or registered to a user of the mobile device. The predefined distance was defined by the user in the profile. In this way, the user can control the distance that the user is within of a given enterprise store before the mobile device transforms the existing mobile application into the store's mobile application.

At 330, the location-based mobile app manager causes configuration data associated with a mobile application of the enterprise store to be delivered to the mobile device to transform the existing mobile application associated with a different store or different enterprise into an executing instance of the mobile application for the enterprise store on the mobile device.

In an embodiment, at 331, the location-based mobile app manager sends an URL to the mobile device that redirects the mobile device to a configuration server to obtain the configuration data.

In an embodiment, at 332, the location-based mobile app manager sends an URL to the mobile device that includes transformations or instructions for transforming the existing mobile application associated with an existing interface to a mobile application interface associated with the mobile application.

In an embodiment of 332 and at 333, the location-based mobile app manager embed within the transformations branding data, feature set data, localization data, and workflow data for the mobile application interface.

In an embodiment, at 334, the location-based mobile app manager causes user customizations and settings associated with the mobile application to be delivered with the configuration data to the mobile device.

In an embodiment, the location-based mobile app manager is processed as a cloud-based service that causes a mobile device to dynamically modify an existing mobile application associated with a first enterprise and its mobile services to a plurality of different mobile applications based on locations of the mobile device. Each different mobile application associated with a different enterprise and/or a different store of a same enterprise (in cases where a single or same enterprise has stores with their own independent web services, product catalogues, branding, etc.).

Figure 4:
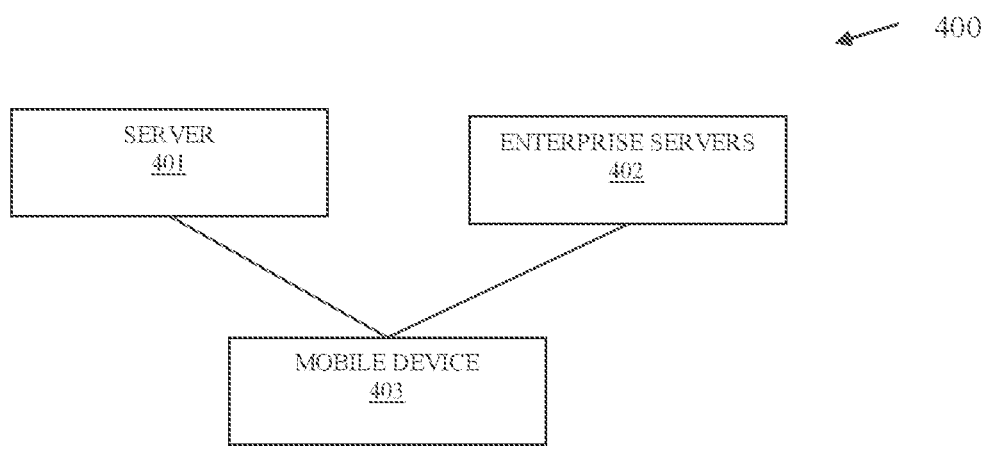
FIG. 4 is a diagram of another system for location-based mobile application processing, according to an example embodiment.

FIG. 4 is a diagram of a system 400 for self-contained configuration of a scanner/scale, according to an example embodiment. The system 400 includes a variety of hardware components and software components. The software components of the system 400 are programmed and reside within memory and/or a non-transitory computer-readable medium and execute on one or more processors of the system 400. The terminal during operation has access to one or more networks, which can be wired, wireless, or a combination of wired and wireless.

The system 400 implements, inter alia, the processing described above with respect to the FIGS. 1-3.

The system 400 includes a server 401, a plurality of enterprise servers 402, and a mobile device 403. Each of the server 401, the enterprise servers 402, and the mobile device 403 include their own corresponding hardware processors and non-transitory computer-readable media having executable instructions, which when executed by the hardware processors cause the processors to perform the processing discussed herein and below.

In an embodiment, the server 401 is configured to perform the processing discussed above with respect to the location-based router 111, the location-based app configuration service 112, and the method 300 of the FIG. 3.

In an embodiment, the mobile device 403 is configured to perform the processing discussed above with respect to the location-based configuration service 131, the executing instance of the enterprise app 132, and the method 200 of the FIG. 2.

The mobile device 403 is configured to: 1) report current physical locations of the mobile device to the server 401; 2) receive configuration data from the server 401 based on reporting the current physical locations; 3) transform an existing interface associated with an existing mobile application into different enterprise mobile application interfaces associated with different enterprises as enterprise mobile application executing instances using the configuration data; and 4) connect the enterprise mobile application executing instances to corresponding ones of the enterprise services for interaction by the user with mobile services provided by the different enterprises.

In an embodiment, the mobile device 403 is further configured to: 5) apply user settings specific to each of the mobile services to the enterprise mobile application executing instances when connecting the enterprise mobile application executing instances to the corresponding ones of the enterprise services 402.

The server 401 is configured to: 1) determine select ones of the enterprise servers based on the current physical locations of the mobile device 403; 2) determine the configuration data based on the select ones of the enterprise servers 402; and 3) cause the configuration data to be delivered to the mobile device 403.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

APPENDIX A

```xml
<?xml version="1.0" encoding="utf-8" ?>
<?xaml-comp compile="true" ?>
<ResourceDictionary xmlns="http://xamarin.com/schemas/2014/forms"

xmlns:x="http://schemas.microsoft.com/winfx/2009/xaml"
            xmlns:n="clr-
namespace:NCRXamarinFormsControls;assembly=NCRXamarinFormsCont
rols"
            xmlns:t="clr-
namespace:Xam.Plugin.TabView;assembly=Xam.Plugin.TabView"
            x:Class="FLMSStyles.MrMerchant">

<!-- Colors -->
  <Color x:Key="GradientStartColor">#262627</Color>
  <Color x:Key="GradientMiddleColor">#c8cbce</Color>
  <Color x:Key="GradientEndColor">#808182</Color>
  <Color x:Key="ItemDescriptionTextColor">#8A161F28</Color>
  <Color x:Key="NavigationBackgroundColor">#61B0BC</Color>
  <Color x:Key="CartTextColor">#161F28</Color>
  <Color x:Key="ScanCardTextColor">#FFFFFFFF</Color>
  <Color x:Key="ScanCardFooterTextColor">#FF62BB51</Color>
  <Color x:Key="DoneScanningColor">#013C4C</Color>
  <Color x:Key="ButtonBackgroundColor">#61B0BC</Color>
  <Color x:Key="ButtonTextColor">#231f20</Color>
  <Color x:Key="ButtonBorderColor">#007A98</Color>
  <Color x:Key="DisabledButtonBackgroundColor">#E9ECEF</Color>
  <Color x:Key="DisabledButtonTextColor">#818C96</Color>
  <Color x:Key="SelectedButtonBackgroundColor">#005B72</Color>
  <Color x:Key="PageTitleTextColor">#161F28</Color>
```

```
<Color x:Key="LoginTextColor">#161F28</Color>
<Color x:Key="LoginHeaderTextColor">#161F28</Color>
<Color x:Key="LoginSubHeaderTextColor">#28333d</Color>
<Color x:Key="LoginRequiredTextColor">#E55284</Color>
<Color x:Key="ForgotUserNamePasswordTextColor">#007A98</Color>
<Color x:Key="InvalidLoginTextColor">#ED5562</Color>
<Color x:Key="UsernamePasswordFieldTextColor">#ABB2B9</Color>
<Color x:Key="UsernamePasswordFieldBackgroundColor">#E9ECEF</Color>
<Color x:Key="StackLayoutBarBackgroundColor">#61B0BC</Color>
<Color x:Key="NavigationBarBackgroundColor">#61B0BC</Color>
<Color x:Key="NormalTextFieldTextColor">#A2A2A2</Color>
<Color x:Key="NormalTextFieldBackgroundColor">#F4F5F7</Color>
<Color x:Key="TermsAndConditionTextColor">#161F28</Color>
<Color x:Key="AppTourTextColor">#161F28</Color>
<Color x:Key="VersionNumberTextColor">#818C96</Color>
<Color x:Key="AboutContentTextColor">#007A98</Color>
<Color x:Key="CheckoutLayoutStBackgroundColor">#F4F5F7</Color>
<Color x:Key="ItemNameTextColor">#161F28</Color>
<Color x:Key="SeeAttendantTextColor">#161F28</Color>
<Color x:Key="WelcomePageBackgroundColor">#EBEEF1</Color>

<!-- Constants -->
<x:Double x:Key="TextOpacity">0.87</x:Double>
<x:Double x:Key="WelcomeTextOpacity">0.5</x:Double>
<x:Double x:Key="QuantityTextOpacity">0.87</x:Double>

<!-- Base Styles -->
<Style x:Key="GradientBarStyle" TargetType="n:GradientBar">
   <Setter Property="StartColor" Value="{StaticResource GradientStartColor}" />
```

```
<Setter Property="MiddleColor" Value="{StaticResource GradientMiddleColor}" />
<Setter Property="EndColor" Value="{StaticResource GradientEndColor}" />
</Style>

<Style TargetType="NavigationPage">
  <Setter Property="BarBackgroundColor">
    <Setter.Value>
      <OnPlatform UWP="white" iOS="{StaticResource NavigationBackgroundColor}" Android="{StaticResource NavigationBackgroundColor}" />
    </Setter.Value>
  </Setter>
  <Setter Property="BarTextColor">
    <Setter.Value>
      <OnPlatform UWP="black" iOS="white" Android="white" />
    </Setter.Value>
  </Setter>
</Style>

<!-- Buttons -->
<Style x:Key="PrimaryButtonStyle" TargetType="Button">
  <!-- Normal State -->
  <Setter Property="BackgroundColor" Value="{StaticResource ButtonBackgroundColor}" />
  <Setter Property="TextColor" Value="{StaticResource ButtonTextColor}" />
  <Setter Property="CornerRadius" Value="3"/>
  <Setter Property="FontFamily" Value="OpenSans"/>
  <Setter Property="Margin" Value="15, 1, 15, 1"/>
```

```xml
<!-- Disabled State -->
<Style.Triggers>
  <Trigger TargetType="Button"
          Property="IsEnabled" Value="False">
    <Setter Property="TextColor" Value="{StaticResource DisabledButtonTextColor}" />
    <Setter Property="FontFamily" Value="Lato-Regular"/>
    <Setter Property="BackgroundColor" Value="{StaticResource DisabledButtonBackgroundColor}" />
    <Setter Property="CornerRadius" Value="3"/>
    <Setter Property="Margin" Value="15, 1, 15, 1"/>
  </Trigger>
</Style.Triggers>
</Style>
<Style x:Key="SecondaryButtonStyle" TargetType="Button">
  <!-- Normal State -->
  <Setter Property="TextColor" Value="{StaticResource ButtonBorderColor}" />
  <Setter Property="FontFamily" Value="OpenSans"/>
  <Setter Property="CornerRadius" Value="3"/>
  <Setter Property="BorderWidth" Value="1"/>
  <Setter Property="BorderColor" Value="{StaticResource ButtonBorderColor}" />
  <Setter Property="BackgroundColor" Value="White"/>
  <Setter Property="Margin" Value="15, 1, 15, 1"/>
  <!-- Disabled State -->
  <Style.Triggers>
    <Trigger TargetType="Button"
            Property="IsEnabled" Value="False">
      <Setter Property="TextColor" Value="{StaticResource DisabledButtonTextColor}" />
```

```xml
<Setter Property="FontFamily" Value="Lato-Regular"/>
<Setter Property="BackgroundColor" Value="{StaticResource DisabledButtonBackgroundColor}" />
<Setter Property="CornerRadius" Value="3"/>
<Setter Property="Margin" Value="15, 1, 15, 1"/>
  </Trigger>
 </Style.Triggers>
</Style>
<Style x:Key="SelectedButtonStyle" TargetType="Button">
<Setter Property="TextColor" Value="White"/>
<Setter Property="FontFamily" Value="Lato-Regular"/>
<Setter Property="BackgroundColor" Value="{StaticResource SelectedButtonBackgroundColor}" />
<Setter Property="CornerRadius" Value="3"/>
<Setter Property="Margin" Value="15, 1, 15, 1"/>
</Style>

<!-- Headers -->
<Style x:Key="PageTitleStyle" TargetType="Label">
<Setter Property="TextColor" Value="{StaticResource PageTitleTextColor}" />
<Setter Property="FontSize" Value="Medium"/>
<Setter Property="FontFamily" Value="OpenSans"/>
<Setter Property="HorizontalTextAlignment" Value="Center"/>
<Setter Property="HorizontalOptions" Value="CenterAndExpand"/>
</Style>
<Style x:Key="PageHeaderStyle" TargetType="Label">
<Setter Property="TextColor" Value="{StaticResource PageTitleTextColor}" />
<Setter Property="FontFamily" Value="Castellar" />
</Style>
```

```
<Style x:Key="InstructionTextStyle" TargetType="Label"
BasedOn="{StaticResource PageHeaderStyle}">
  <Setter Property="FontSize" Value="Large" />
  <Setter Property="FontAttributes" Value="Bold" />
</Style>

<Style x:Key="LabelHeaderStyle" TargetType="Label">
  <Setter Property="TextColor" Value="{StaticResource
PageTitleTextColor}" />
  <Setter Property="FontSize" Value="14"/>
  <Setter Property="FontFamily" Value="Castellar"/>
</Style>

<!-- Stack Layout -->
<Style x:Key="StackLayoutBarWithBGColor" TargetType="StackLayout">
  <Setter Property="BackgroundColor" Value="{StaticResource
StackLayoutBarBackgroundColor}" />
  <Setter Property="Padding" Value="0"/>
  <Setter Property="Spacing" Value="0"/>
</Style>

<Style x:Key="NavigationBarLayoutStyle" TargetType="Grid">
  <Setter Property="VerticalOptions" Value="StartAndExpand"/>
  <Setter Property="HorizontalOptions" Value="FillAndExpand"/>
  <Setter Property="BackgroundColor" Value="{StaticResource
NavigationBarBackgroundColor}" />
</Style>

<!-- Text Fields -->
<Style x:Key="NormalTextFieldStyle" TargetType="Entry">
```

```
<Setter Property="TextColor" Value="{StaticResource NormalTextFieldTextColor}" />
<Setter Property="FontFamily" Value="OpenSans"/>
<Setter Property="BackgroundColor" Value="{StaticResource NormalTextFieldBackgroundColor}" />
</Style>
<!-- Images -->
<Style x:Key="LogoImage" TargetType="Image">
  <Setter Property="Source" Value="mrmerchantlogo.png"/>
  <Setter Property="Margin" Value="20,20,20,20"/>
</Style>

<Style x:Key="StartOfTripBackgroundImage" TargetType="Image">
  <Setter Property="Source" Value="mrmerchantwelcome.jpg" />
  <Setter Property="HorizontalOptions" Value="FillAndExpand" />
  <Setter Property="VerticalOptions" Value="FillAndExpand" />
  <Setter Property="Aspect" Value="AspectFill" />
</Style>

<Style x:Key="StoreMapImage" TargetType="Image">
  <Setter Property="Source" Value="mrmerchantstoremap.png" />
  <Setter Property="VerticalOptions" Value="FillAndExpand" />
  <Setter Property="Aspect" Value="AspectFit" />
</Style>

<!-- Login Page-->
<Style x:Key="LoginHeaderStyle" TargetType="Label" BasedOn="{StaticResource PageHeaderStyle}">
  <Setter Property="Margin" Value="0, 40, 0, 0" />
  <Setter Property="TextColor" Value="{StaticResource LoginHeaderTextColor}" />
```

```
<Setter Property="FontFamily" Value="Castellar"/>
<Setter Property="FontSize" Value="16"/>
</Style>
<Style x:Key="LoginHeaderSubTitleStyle" TargetType="Label"
BasedOn="{StaticResource LoginHeaderStyle}">
    <Setter Property="Margin" Value="0, 0, 0, 0" />
    <Setter Property="TextColor" Value="{StaticResource
LoginSubHeaderTextColor}" />
    <Setter Property="FontFamily" Value="OpenSans"/>
</Style>
<Style x:Key="LoginWelcomeTextStyle" TargetType="Label">
    <Setter Property="Margin" Value="20, 20, 20 ,0" />
    <Setter Property="TextColor" Value="{StaticResource LoginTextColor}" />
    <Setter Property="Text" Value="Castellar"/>
    <Setter Property="FontSize" Value="20"/>
</Style>
<Style x:Key="LoginWelcomeSubTitleStyle" TargetType="Label"
BasedOn="{StaticResource LoginWelcomeTextStyle}">
    <Setter Property="Margin" Value="20, 0, 20 ,0" />
    <Setter Property="Text" Value="OpenSans"/>
    <Setter Property="FontSize" Value="14" />
</Style>
<Style x:Key="LoginRequiredStyle" TargetType="Label">
    <Setter Property="TextColor" Value="{StaticResource
LoginRequiredTextColor}" />
    <Setter Property="FontSize" Value="12" />
    <Setter Property="FontFamily" Value="OpenSans-Bold" />
</Style>
<Style x:Key="LoginRequiredTextsStyle" TargetType="Label"
BasedOn="{StaticResource LoginRequiredStyle}">
    <Setter Property="TextColor" Value="{StaticResource LoginTextColor}" />
```

```
</Style>
<Style x:Key="LoginUsernamePasswordTextsStyle" TargetType="Label"
BasedOn="{StaticResource LoginRequiredStyle}">
    <Setter Property="TextColor" Value="{StaticResource LoginTextColor}" />
    <Setter Property="FontFamily" Value="OpenSans-Bold" />
    <Setter Property="FontSize" Value="14" />
</Style>
<Style x:Key="LoginButtonStyle" TargetType="Button"
BasedOn="{StaticResource PrimaryButtonStyle}">
    <Setter Property="Margin" Value="0"/>
    <Setter Property="WidthRequest"  Value="90"/>
    <Setter Property="HeightRequest"  Value="40"/>
</Style>
<Style x:Key="ForgotUsernamePasswordTextStyle" TargetType="Label"
BasedOn="{StaticResource LabelHeaderStyle}">
    <Setter Property="TextColor" Value="{StaticResource
ForgotUserNamePasswordTextColor}" />
</Style>
<Style x:Key="InvalidLoginTextStyle" TargetType="Label"
BasedOn="{StaticResource LoginRequiredStyle}">
    <Setter Property="TextColor" Value="{StaticResource
InvalidLoginTextColor}" />
    <Setter Property="FontFamily" Value="OpenSans"/>
</Style>
<Style x:Key="UsernamePasswordTextFieldStyle"
TargetType="n:CustomEntry">
    <Setter Property="HeightRequest" Value="40" />
    <Setter Property="BorderColor" Value="{StaticResource
UsernamePasswordFieldTextColor}" />
    <Setter Property="FontSize" Value="14" />
    <Setter Property="Margin" Value="0" />
```

```
<Setter Property="TextColor" Value="{StaticResource LoginTextColor}" />
<Setter Property="BackgroundColor" Value="{StaticResource UsernamePasswordFieldBackgroundColor}" />
</Style>

<!-- Terms and Conditions Page -->
<Style x:Key="TermsAndConditionsTitleStyle" TargetType="Label" BasedOn="{StaticResource PageHeaderStyle}">
    <Setter Property="TextColor" Value="{StaticResource TermsAndConditionTextColor}" />
    <Setter Property="BackgroundColor" Value="Transparent"/>
    <Setter Property="FontSize" Value="Large"/>
    <Setter Property="FontFamily" Value="OpenSans-Bold"/>
    <Setter Property="Margin" Value="20,40,20,50"/>
    <Setter Property="HorizontalTextAlignment" Value="Center"/>
</Style>
<Style x:Key="TermsAndConditionsSubTitleStyle" TargetType="Label" BasedOn="{StaticResource PageHeaderStyle}">
    <Setter Property="TextColor" Value="{StaticResource TermsAndConditionTextColor}" />
    <Setter Property="BackgroundColor" Value="Transparent"/>
    <Setter Property="FontSize" Value="Medium"/>
    <Setter Property="FontFamily" Value="OpenSans-Bold"/>
    <Setter Property="Margin" Value="30,0,30,50"/>
    <Setter Property="HorizontalTextAlignment" Value="Start"/>
</Style>
<Style x:Key="AcceptButtonStyle" TargetType="Button" BasedOn="{StaticResource PrimaryButtonStyle}">
    <Setter Property="HorizontalOptions" Value="End"/>
    <Setter Property="WidthRequest" Value="160"/>
    <Setter Property="Margin" Value="0,0,20,0"/>
```

```
<Setter Property="Grid.Row" Value="0"/>
<Setter Property="Grid.Column" Value="1"/>
</Style>
<Style x:Key="DeclineButtonStyle" TargetType="Button"
BasedOn="{StaticResource SecondaryButtonStyle}">
    <Setter Property="HorizontalOptions" Value="Start"/>
    <Setter Property="WidthRequest" Value="160"/>
    <Setter Property="Margin" Value="20,0,0,0"/>
    <Setter Property="Grid.Row" Value="0"/>
    <Setter Property="Grid.Column" Value="0"/>
</Style>

<!-- App Tour Page -->
<Style x:Key="AppTourLogoImageStyle" TargetType="Image">
  <Setter Property="Margin" Value="10, 10, 10, 10"/>
</Style>
<Style x:Key="AppTourBodyImageStyle" TargetType="Image">
  <Setter Property="Margin" Value="10, 10, 10, 10"/>
</Style>
<Style x:Key="AppTourTabIndicatorNormalStyle" TargetType="Image">
  <Setter Property="Source" Value="tabselectornormal.png"/>
</Style>
<Style x:Key="AppTourTabIndicatorSelectedStyle" TargetType="Image">
  <Setter Property="Source" Value="tabselectorselected.png"/>
</Style>
<Style x:Key="AppTourHeaderStyle" TargetType="Label"
BasedOn="{StaticResource PageHeaderStyle}">
    <Setter Property="TextColor" Value="{StaticResource AppTourTextColor}" />
    <Setter Property="BackgroundColor" Value="Transparent"/>
    <Setter Property="FontSize" Value="24"/>
```

```
<Setter Property="FontFamily" Value="OpenSans-Bold"/>
<Setter Property="HorizontalTextAlignment" Value="Center"/>
</Style>
<Style x:Key="AppTourSubHeaderStyle" TargetType="Label" BasedOn="{StaticResource PageHeaderStyle}">
<Setter Property="TextColor" Value="{StaticResource AppTourTextColor}" />
<Setter Property="BackgroundColor" Value="Transparent"/>
<Setter Property="FontSize" Value="15"/>
<Setter Property="FontFamily" Value="OpenSans-Bold"/>
<Setter Property="HorizontalTextAlignment" Value="Center"/>
<Setter Property="Margin" Value="5, 0, 5, 0"/>
</Style>
<Style x:Key="StartShoppingButtonStyle" TargetType="Button" BasedOn="{StaticResource PrimaryButtonStyle}">
<Setter Property="Margin" Value="10, 10, 10, 10"/>
</Style>

<!--Welcome Page-->
<Style x:Key="WelcomeTextBackgroundStyle" TargetType="BoxView">
<Setter Property="Opacity" Value="{StaticResource WelcomeTextOpacity}" />
<Setter Property="Color" Value="Black" />
</Style>

<Style x:Key="WelcomeTextStyle" TargetType="Label" BasedOn="{StaticResource PageHeaderStyle}">
<Setter Property="TextColor" Value="White" />
<Setter Property="FontSize" Value="Large" />
<Setter Property="FontAttributes" Value="Bold" />
<Setter Property="Margin" Value="10,10,10,5"/>
```

```
<Setter Property="HorizontalOptions" Value="Center" />
<Setter Property="VerticalOptions" Value="Center" />
<Setter Property="HorizontalTextAlignment" Value="Center" />
</Style>

<Style x:Key="InformationTextStyle" TargetType="Label"
BasedOn="{StaticResource PageHeaderStyle}">
    <Setter Property="TextColor" Value="White" />
    <Setter Property="FontSize" Value="Medium" />
    <Setter Property="Margin" Value="10,0,10,0"/>
    <Setter Property="HorizontalOptions" Value="Center" />
    <Setter Property="HorizontalTextAlignment" Value="Center" />
</Style>

<Style x:Key="ScanQRCodeButtonStyle" TargetType="Button"
BasedOn="{StaticResource SecondaryButtonStyle}">
    <Setter Property="HeightRequest" Value="50" />
    <Setter Property="HorizontalOptions" Value="FillAndExpand" />
    <Setter Property="VerticalOptions" Value="End" />
    <Setter Property="Margin" Value="10,0,10,30" />
</Style>

<!--About Page-->
<Style x:Key="AboutLogoStyle" TargetType="Image">
    <Setter Property="Source" Value="mrmerchantlargelogo.png" />
    <Setter Property="WidthRequest" Value="250" />
    <Setter Property="VerticalOptions" Value="EndAndExpand" />
</Style>
<Style x:Key="VersionNumberTextStyle" TargetType="Label">
    <Setter Property="TextColor" Value="{StaticResource VersionNumberTextColor}" />
```

```xml
<Setter Property="FontSize" Value="Medium"/>
<Setter Property="Margin" Value="0,20,0,0" />
<Setter Property="FontFamily" Value="OpenSans"/>
<Setter Property="HorizontalOptions" Value="CenterAndExpand"/>
</Style>
<Style x:Key="AboutApplicationTextStyle" TargetType="Label">
  <Setter Property="FontSize" Value="Medium"/>
  <Setter Property="Margin" Value="20" />
  <Setter Property="XAlign" Value="Center" />
</Style>
<Style x:Key="AboutContentTextStyle" TargetType="Label">
  <Setter Property="FontSize" Value="Medium"/>
  <Setter Property="Margin" Value="30" />
  <Setter Property="TextColor" Value="{StaticResource AboutContentTextColor}" />
  <Setter Property="FontAttributes" Value="Bold" />
  <Setter Property="HorizontalOptions" Value="CenterAndExpand"/>
</Style>

<!--Cart page-->
<Style x:Key="TitleTextStyle" TargetType="Label">
  <Setter Property="BackgroundColor" Value="{StaticResource NavigationBackgroundColor}" />
  <Setter Property="HorizontalTextAlignment" Value="Center" />
  <Setter Property="VerticalTextAlignment" Value="Center" />
  <Setter Property="FontSize" Value="Large" />
  <Setter Property="TextColor" Value="White" />
</Style>
<Style x:Key="CheckoutLayoutStyle" TargetType="StackLayout">
  <Setter Property="BackgroundColor" Value="{StaticResource CheckoutLayoutStBackgroundColor}" />
```

```
<Setter Property="Padding" Value="10" />
</Style>
<Style x:Key="TotalTextStyle" TargetType="Label">
  <Setter Property="FontSize" Value="Medium" />
  <Setter Property="HorizontalTextAlignment" Value="Center" />
  <Setter Property="TextColor" Value="{StaticResource CartTextColor}"/>
  <Setter Property="Opacity" Value="{StaticResource TextOpacity}" />
</Style>
<Style x:Key="ItemCountTextStyle" TargetType="Label" BasedOn="{StaticResource TotalTextStyle}">
  <Setter Property="HorizontalTextAlignment" Value="Start" />
</Style>
<Style x:Key="CheckoutButtonStyle" TargetType="Button">
  <Setter Property="BackgroundColor" Value="{StaticResource DoneScanningColor}" />
  <Setter Property="Margin" Value="0,7,0,0" />
  <Setter Property="FontSize" Value="Medium" />
  <Setter Property="TextColor" Value="White" />
</Style>
<Style x:Key="ItemNameLabelStyle" TargetType="Label">
  <Setter Property="FontSize" Value="Medium" />
  <Setter Property="FontAttributes" Value="Bold" />
  <Setter Property="LineBreakMode" Value="TailTruncation" />
  <Setter Property="MaxLines" Value="2" />
  <Setter Property="Opacity" Value="{StaticResource TextOpacity}" />
  <Setter Property="TextColor" Value="{StaticResource ItemNameTextColor}" />
</Style>
<Style x:Key="ItemDescriptionStyle" TargetType="Label">
  <Setter Property="LineBreakMode" Value="WordWrap" />
  <Setter Property="FontSize" Value="Small" />
```

```xml
    <Setter Property="TextColor" Value="{StaticResource ItemDescriptionTextColor}" />
  </Style>
  <Style x:Key="ItemDetailsLabelStyle" TargetType="Label" BasedOn="{StaticResource ItemNameLabelStyle}">
    <Setter Property="FontSize" Value="Small" />
    <Setter Property="TextDecorations" Value="Underline" />
    <Setter Property="Margin" Value="0,10,0,0" />
    <Setter Property="HorizontalOptions" Value="Start" />
  </Style>
  <Style x:Key="ItemPriceLabelStyle" TargetType="Label" BasedOn="{StaticResource ItemNameLabelStyle}">
    <Setter Property="FontSize" Value="Large" />
    <Setter Property="XAlign" Value="Center" />
    <Setter Property="Opacity" Value="1" />

</Style>
  <Style x:Key="RemoveLabelStyle" TargetType="Label" BasedOn="{StaticResource ItemDetailsLabelStyle}">
    <Setter Property="HorizontalOptions" Value="End" />
    <Setter Property="VerticalOptions" Value="EndAndExpand" />
    <Setter Property="Margin" Value="0" />
  </Style>
  <Style x:Key="QuantityLabelStyle" TargetType="Label">
    <Setter Property="FontAttributes" Value="Bold" />
    <Setter Property="TextColor" Value="{StaticResource CartTextColor}" />
    <Setter Property="Opacity" Value="{StaticResource QuantityTextOpacity}" />
    <Setter Property="VerticalTextAlignment" Value="Center" />
  </Style>
  <Style x:Key="QuantityPickerStyle" TargetType="Picker">
```

```
<Setter Property="FontAttributes" Value="Bold" />
<Setter Property="TextColor" Value="{StaticResource CartTextColor}" />
<Setter Property="Opacity" Value="{StaticResource QuantityTextOpacity}" />
</Style>
<Style x:Key="TabsStyle" TargetType="t:TabViewControl">
<Setter Property="HeaderBackgroundColor" Value="White" />
<Setter Property="HeaderTabTextFontFamily" Value="Roboto-Medium" />
<Setter Property="HeaderSelectionUnderlineThickness" Value="2" />
<Setter Property="HeaderSelectionUnderlineColor" Value="Black" />
<Setter Property="HeaderTabTextColor" Value="Black" />
<Setter Property="HeaderTabTextFontSize" Value="Small" />
</Style>
<Style x:Key="ItemDetailTabsStyle" TargetType="t:TabViewControl" BasedOn="{StaticResource TabsStyle}">
</Style>
<Style x:Key="StoreLogoStyle" TargetType="Image">
  <Setter Property="Source" Value="ncrlogo.png" />
</Style>

<!-- Description Details -->
<Style x:Key="DetailsItemNameLabelStyle" TargetType="Label" BasedOn="{StaticResource ItemNameLabelStyle}">
  <Setter Property="FontSize" Value="Large" />
</Style>
<Style x:Key="DetailsQuantityLabelStyle" TargetType="Label" BasedOn="{StaticResource QuantityLabelStyle}">
  <Setter Property="FontSize" Value="Small" />
</Style>
```

```
<!-- EMDK Scan Loyalty Card Page -->
<Style x:Key="ScanLoyaltyCardBackgroundImage" TargetType="Image">
  <Setter Property="Source" Value="scancardbasebackground.png" />
  <Setter Property="HorizontalOptions" Value="FillAndExpand" />
  <Setter Property="VerticalOptions" Value="FillAndExpand" />
  <Setter Property="Aspect" Value="AspectFill" />
</Style>
<Style x:Key="ScanCardImageStyle" TargetType="Image">
  <Setter Property="Source" Value="scancard.png" />
  <Setter Property="HeightRequest" Value="130" />
</Style>
<Style x:Key="ScanCardTitleStyle" TargetType="Label" BasedOn="{StaticResource PageHeaderStyle}">
  <Setter Property="TextColor" Value="{StaticResource ScanCardTextColor}"/>
  <Setter Property="BackgroundColor" Value="Transparent"/>
  <Setter Property="FontSize" Value="30"/>
  <Setter Property="FontFamily" Value="OpenSans-Bold"/>
  <Setter Property="Margin" Value="40,0,40,50"/>
  <Setter Property="HorizontalTextAlignment" Value="Center"/>
</Style>
<Style x:Key="ScanCardFooterStyle" TargetType="Label" BasedOn="{StaticResource PageHeaderStyle}">
  <Setter Property="TextColor" Value="{StaticResource ScanCardFooterTextColor}"/>
  <Setter Property="BackgroundColor" Value="Transparent"/>
  <Setter Property="FontSize" Value="Micro"/>
  <Setter Property="FontFamily" Value="OpenSans-Bold"/>
  <Setter Property="Margin" Value="40,0,40,10"/>
  <Setter Property="VerticalOptions" Value="End"/>
  <Setter Property="HorizontalTextAlignment" Value="Center"/>
```

```
</Style>

<!--Attendant Cart Page-->
<Style x:Key="AttendantItemBaseStyle" TargetType="Label">
  <Setter Property="FontFamily" Value="Roboto-Medium" />
  <Setter Property="TextColor" Value="{StaticResource CartTextColor}" />
  <Setter Property="FontSize" Value="Small" />
</Style>

<Style x:Key="AttendantItemNameStyle" TargetType="Label"
BasedOn="{StaticResource AttendantItemBaseStyle}">
  <Setter Property="LineBreakMode" Value="WordWrap" />
</Style>

<Style x:Key="AttendantItemQuantityStyle" TargetType="Label"
BasedOn="{StaticResource AttendantItemBaseStyle}">
  <Setter Property="TextDecorations" Value="Underline" />
  <Setter Property="HorizontalTextAlignment" Value="Center" />
</Style>
<Style x:Key="AttendantItemPriceStyle" TargetType="Label"
BasedOn="{StaticResource AttendantItemBaseStyle}">
  <Setter Property="HorizontalOptions" Value="End" />
  <Setter Property="Margin" Value="5,0,5,0" />
</Style>
<Style x:Key="AttendantQuantityPickerStyle" TargetType="Picker">
  <Setter Property="VerticalOptions" Value="Start" />
  <Setter Property="MinimumHeightRequest" Value="40" />
  <Setter Property="MinimumWidthRequest" Value="40" />
  <Setter Property="FontFamily" Value="Roboto-Medium" />
  <Setter Property="FontSize" Value="18" />
  <Setter Property="FontSize" Value="Small" />
```

```
    <Setter Property="TextColor" Value="{StaticResource CartTextColor}" />
    <Setter Property="Opacity" Value="{StaticResource
QuantityTextOpacity}" />
  </Style>

<!--Wallet Page-->
  <Style x:Key="WalletTabsStyle" TargetType="t:TabViewControl"
BasedOn="{StaticResource TabsStyle}">
  </Style>

<Style x:Key="EnrollWalletButtonStyle" TargetType="Button"
BasedOn="{StaticResource PrimaryButtonStyle}">
    <Setter Property="Margin" Value="0"/>
    <Setter Property="WidthRequest" Value="120" />
    <Setter Property="HeightRequest" Value="40"/>
  </Style>

<Style x:Key="RetrieveWalletButtonStyle" TargetType="Button"
BasedOn="{StaticResource PrimaryButtonStyle}">
    <Setter Property="Margin" Value="0"/>
    <Setter Property="WidthRequest" Value="120" />
    <Setter Property="HeightRequest" Value="40"/>
  </Style>

<Style x:Key="CancelWalletActionButtonStyle" TargetType="Button"
BasedOn="{StaticResource SecondaryButtonStyle}">
    <Setter Property="Margin" Value="0"/>
    <Setter Property="WidthRequest" Value="120" />
    <Setter Property="HeightRequest" Value="40"/>
  </Style>
```

```
<!--Display Transaction Barcode-->
<Style x:Key="AlertSuccessIconStyle" TargetType="Image">
  <Setter Property="Source" Value="alertsuccess.png" />
  <Setter Property="HeightRequest" Value="50" />
  <Setter Property="Margin" Value="20,50,20,20" />
</Style>

<Style x:Key="EMDKScanInstructionTextStyle" TargetType="Label" >
  <Setter Property="VerticalTextAlignment" Value="Center" />
  <Setter Property="HorizontalTextAlignment" Value="Center" />
  <Setter Property="FontSize" Value="Large" />
  <Setter Property="TextColor" Value="Black" />
</Style>

<Style x:Key="TransactionBarcodeStyle" TargetType="Label" >
  <Setter Property="VerticalTextAlignment" Value="Center" />
  <Setter Property="HorizontalTextAlignment" Value="Center" />
</Style>

<Style x:Key="BarcodeImageStyle" TargetType="Image">
  <Setter Property="HorizontalOptions" Value="Center" />
  <Setter Property="WidthRequest" Value="500" />
  <Setter Property="HeightRequest" Value="500" />
</Style>

<Style x:Key="OKButtonStyle" TargetType="Button">
  <Setter Property="Margin" Value="10,10,10,20" />
  <Setter Property="TextColor" Value="White" />
  <Setter Property="BackgroundColor" Value="{StaticResource DoneScanningColor}" />
</Style>
```

```xml
<Style x:Key="DisplayBarcodeGridStyle" TargetType="Grid">
  <Setter Property="BackgroundColor" Value="White" />
</Style>

<!--Pick Me Up-->
<Style x:Key="PickMeUpPageLayoutStyle" TargetType="StackLayout">
  <Setter Property="BackgroundColor" Value="Green" />
</Style>
<Style x:Key="PickMeUpLabelStyle" TargetType="Label">
  <Setter Property="TextColor" Value="White" />
  <Setter Property="FontSize" Value="Large" />
  <Setter Property="VerticalOptions" Value="CenterAndExpand" />
  <Setter Property="HorizontalOptions" Value="CenterAndExpand" />
</Style>
<Style x:Key="PickMeUpBackground" TargetType="ContentPage">
  <Setter Property="BackgroundImage" Value="scancardbasebackground.png" />
</Style>

<!-- Put Me Back -->
<Style x:Key="PutMeBackBackground" TargetType="ContentPage">
  <Setter Property="BackgroundColor" Value="White" />
</Style>
<Style x:Key="PutMeBackLabelStyle" TargetType="Label" >
  <Setter Property="FontSize" Value="Medium" />
  <Setter Property="Font" Value="Roboto-Medium" />
  <Setter Property="HorizontalTextAlignment" Value="Center" />
  <Setter Property="VerticalOptions" Value="CenterAndExpand" />
  <Setter Property="HorizontalOptions" Value="CenterAndExpand" />
  <Setter Property="Margin" Value="25" />
```

```
    <Setter Property="FontAttributes" Value="Bold" />
</Style>

<!--MyScan Welcome-->
<Style x:Key="WelcomePageGridStyle" TargetType="Grid">
    <Setter Property="BackgroundColor" Value="{StaticResource WelcomePageBackgroundColor}" />
</Style>
<Style x:Key="WelcomeImageStyle" TargetType="Image">
    <Setter Property="Source" Value="ncrlogo.png" />
    <Setter Property="VerticalOptions" Value="CenterAndExpand" />
</Style>

<!--Diagnostic Info-->
<Style x:Key="DiagInfoLabelStyle" TargetType="Label" >
    <Setter Property="FontSize" Value="Medium" />
    <Setter Property="Font" Value="Roboto-Medium" />
    <Setter Property="FontAttributes" Value="Bold" />
</Style>
<Style x:Key="DiagDeviceTitleLabelStyle" TargetType="Label" >
    <Setter Property="FontSize" Value="40" />
    <Setter Property="Font" Value="Roboto-Medium" />
    <Setter Property="HorizontalTextAlignment" Value="Center" />
    <Setter Property="VerticalOptions" Value="CenterAndExpand" />
    <Setter Property="HorizontalOptions" Value="CenterAndExpand" />
    <Setter Property="FontAttributes" Value="Bold" />
</Style>
<Style x:Key="DiagTerminalIdLabelStyle" TargetType="Label" >
    <Setter Property="FontSize" Value="120" />
    <Setter Property="Font" Value="Roboto-Medium" />
    <Setter Property="HorizontalTextAlignment" Value="Center" />
```

```xml
<Setter Property="VerticalOptions" Value="CenterAndExpand" />
<Setter Property="HorizontalOptions" Value="CenterAndExpand" />
<Setter Property="FontAttributes" Value="Bold" />
</Style>

<!--Hand Over Device-->
<Style x:Key="ContentLayoutStyle" TargetType="ContentPage">
  <Setter Property="BackgroundColor" Value="White" />
</Style>
<Style x:Key="HandOverDeviceLabelStyle" TargetType="Label">
  <Setter Property="VerticalOptions" Value="CenterAndExpand" />
  <Setter Property="HorizontalOptions" Value="CenterAndExpand" />
  <Setter Property="HorizontalTextAlignment" Value="Center" />
</Style>
<Style x:Key="HandOverDeviceLayout" TargetType="StackLayout">
  <Setter Property="HorizontalOptions" Value="Center" />
  <Setter Property="VerticalOptions" Value="Center" />
  <Setter Property="Margin" Value="20" />
</Style>
<Style x:Key="HandOverDeviceWarningImage" TargetType="Image">
  <Setter Property="Source" Value="alertwarning.png" />
  <Setter Property="HeightRequest" Value="50" />
  <Setter Property="HorizontalOptions" Value="Center" />
</Style>
<Style x:Key="SeeAttendantTextStyle" TargetType="Label">
  <Setter Property="FontSize" Value="Large" />
  <Setter Property="TextColor" Value="{StaticResource SeeAttendantTextColor}" />
  <Setter Property="FontFamily" Value="OpenSans-Bold" />
  <Setter Property="HorizontalTextAlignment" Value="Center" />
</Style>
```

```
<!--MyScan App Tour-->
<Style x:Key="StartShoppingAppTourMC18PageLayoutStyle"
TargetType="Grid">
    <Setter Property="BackgroundColor" Value="White" />
</Style>
<!--Payment Cards-->
<Style x:Key="CreditCardImageStyle" TargetType="Image">
    <Setter Property="Margin" Value="20,0,0,0" />
    <Setter Property="HorizontalOptions" Value="Center" />
</Style>
<Style x:Key="CreditCardLayoutStyle" TargetType="StackLayout">
    <Setter Property="Orientation" Value="Vertical" />
    <Setter Property="HorizontalOptions" Value="FillAndExpand" />
    <Setter Property="Margin" Value="0,0,10,0" />
</Style>
<Style x:Key="CreditCardLabelStyle" TargetType="Label">
<Setter Property="HorizontalOptions" Value="EndAndExpand" />
<Setter Property="VerticalOptions" Value="FillAndExpand" />
</Style>

<!--Temporary Item Card-->
<Style x:Key="TemporaryCardLabelStyle"
    TargetType="Label">
    <Setter Property="BackgroundColor"
        Value="Green"/>
    <Setter Property="HorizontalOptions"
        Value="FillAndExpand"/>
    <Setter Property="HorizontalTextAlignment"
        Value="Center"/>
    <Setter Property="TextColor"
```

```
        Value="White"/>
</Style>

<Style x:Key="TemporaryCardStyle"
    BasedOn="{StaticResource TemporaryCardLabelStyle}"
    TargetType="Label">
  <Setter Property="TextColor"
        Value="Green"/>
</Style>
</ResourceDictionary>
```

*Work Flow URL Example*

```xml
<?xml version="1.0" encoding="utf-8" ?>
<workflow>
 <tabs>
   <navItem name="Cart" icon="cart.png" state="CartPage" translationKey="CartScreenModel#HeaderText"/>
   <navItem name="Store Map" icon="map.png" state="StoreMapPage" translationKey="store_map_screen#header"/>
   <navItem name="Scanner" icon="barcode.png" state="ItemScannerWithCartPage" translationKey="Generic#Scanner"/>
   <navItem name="About" icon="about.png" state="AboutPage" translationKey="AboutScreenModel#HeaderText"/>
   <navItem name="App Tour" icon="help.png" state="AppTourPage" translationKey="side_navigation#item_app_tour"/>
   <navItem name="Settings" icon="settings.png" state="SettingsPage" translationKey="settings_screen#header" />
   <navitem name="Logout" icon="signout.png" state="OneLoginPage" translationKey="side_navigation#SignOutLabel"/>
 </tabs>
 <itemDetails>
   <tab name="DescriptionDetails" state="DescriptionDetails" translationKey="ItemDetailModel#tab_description" />
   <tab name="NutritionDetails" state="NutritionDetails" translationKey="ItemDetailModel#tab_advertisements" />
 </itemDetails>
 <statetransitions>
   <state name="TermsAndConditionsPage" start="true" hasBottomNav="false" hasTopNav="false" skipcondition="has_accepted_tandc_key" skipaction="Accept">
     <transition action="Accept" state="OneLoginPage" />
```

```xml
        <transition action="Decline" state="ExitApp" />
    </state>
    <state name="StartShoppingAppTourPage" hasBottomNav="false" hasTopNav="false" skipcondition="has_shown_apptour_key" skipaction="Start">
        <transition action="Start" state="StartOfTripPage" />
    </state>
    <state name="AppTourPage" hasBottomNav="true" hasTopNav="true">
    </state>
    <state name="LoginPage" hasBottomNav="false" hasTopNav="false" skipcondition="has_logged_in_key" skipaction="Success">
        <transition action="Success" state="StartShoppingAppTourPage" />
        <transition action="Fail" state="LoginPage" />
    </state>
    <state name="StartOfTripPage" hasBottomNav="false" hasTopNav="true">
        <transition action="Scan" state="StartTripScannerPage" />
    </state>
    <state name="SettingsPage" hasBottomNav="true" hasTopNav="true">
    </state>
    <state name="StartTripScannerPage" hasBottomNav="false" hasTopNav="true">
        <transition action="StartTrip" state="CartPage" />
        <transition action="Cancel" state="StartOfTripPage" />
    </state>
    <state name="AboutPage" hasBottomNav="true" hasTopNav="true">
    </state>
    <state name="DescriptionDetails" project="FastLaneMobileShopper.Controls" hasBottomNav="true" hasTopNav="true">
    </state>
```

```xml
<state name="NutritionDetails" project="FastLaneMobileShopper.Controls" hasBottomNav="true" hasTopNav="true">
</state>
<state name="ItemDetailsPage" hasBottomNav="true" hasTopNav="true">
    <transition action="GoBack" state="CartPage" />
</state>
<!-- Tray Views -->
<state name="ItemScannerWithCartPage" hasBottomNav="true" hasTopNav="false">
</state>
<state name="CartPage" hasBottomNav="true" hasTopNav="true">
    <transition action="SeeDetails" state="ItemDetailsPage" />
</state>
<state name="ItemScannerPage" hasBottomNav="true" hasTopNav="false">
    <transition action="ScanItem" state="CartPage" />
    <transition action="Cancel" state="CartPage" />
</state>
<state name="StoreMapPage" hasBottomNav="false" hasTopNav="false">
</state>
<state name="MorePage" hasBottomNav="true" hasTopNav="true">
</state>
<!-- Custom Views -->
<state project="FLMSCustomViews" name="OneLoginPage" hasBottomNav="false" hasTopNav="false">
    <transition action="Success" state="StartOfTripPage" />
    <transition action="Fail" state="OneLoginPage" />
</state>
```

```
</statetransitions>

</workflow>
```

The invention claimed is:

1. A method, comprising:

continuously reporting a current physical location of a mobile device to a server;

receiving configuration data associated with an enterprise application (app) for an enterprise detected to be within a configured distance of the current physical location by the server;

transforming an existing mobile app associated with an existing enterprise to an instance of the enterprise app using the configuration data;

connecting the instance to an enterprise server of the enterprise using the configuration data;

processing the instance on the mobile device to interact with enterprise mobile services associated with the enterprise;

detecting a predefined event;

removing the instance from memory of the mobile device based on the predefined event;

launching the existing mobile app responsive to a user activation of an icon associated with the existing mobile app from a touch screen display of the mobile device;

detecting a change application option selected from the existing mobile app;

displaying a list of available mobile apps;

receiving a selected mobile app;

obtaining new configuration data for the selected mobile app;

removing an executing instance of the existing mobile app from the mobile device;

transforming the existing mobile app into the selected mobile app instance of the selected mobile app;

connecting to the selected mobile app instance to a new enterprise server associated with the selected mobile app; and launching the selected mobile app instance on the mobile device to interact with new enterprise mobile services associated with the new enterprise server.

2. The method of claim 1, wherein receiving further receiving a Uniform Resource Locator (URL) link from the server that directs the mobile device to use the URL to obtain the configuration data from a configuration server.

3. The method of claim 1, wherein receiving further includes identifying from the configuration data: branding data, feature set data, localization data, and workflow data for an interface associated with the enterprise app.

4. The method of claim 1, wherein identifying further includes processing a Uniform Resource Locator (URL) received as the configuration data to obtain the branding data, the feature data, the localization data, and the workflow data.

5. The method of claim 1, wherein transforming further includes processing transformations from an existing interface associated with the existing mobile app to an enterprise interface associated with the enterprise app, wherein the transformations and the configuration data are provided in a Uniform Resource Locator (URL) that is parsed and processed on the mobile device.

6. The method of claim 1, wherein connecting further includes applying user settings associated with a user when connecting to the enterprise server, wherein the user settings are specific to customization of a user that operated the mobile device and the enterprise mobile application.

7. The method of claim 6, wherein applying further includes obtaining the user settings from the mobile device.

8. The method of claim 6, wherein applying further includes obtaining the user settings from the server or a different server.

* * * * *